United States Patent
Udagawa

[19]

[11] Patent Number: 6,056,295
[45] Date of Patent: May 2, 2000

[54] METAL LAMINATE GASKET

[75] Inventor: Tsunekazu Udagawa, Ichikawa, Japan

[73] Assignee: Ishikawa Gasket Co., Ltd., Tokyo, Japan

[21] Appl. No.: 09/000,783

[22] Filed: Dec. 30, 1997

[51] Int. Cl.⁷ .............................. F16J 15/08; F02F 11/00
[52] U.S. Cl. ................................................... 277/595
[58] Field of Search ................................ 277/593, 594, 277/595, 598

[56] References Cited

U.S. PATENT DOCUMENTS

| | | |
|---|---|---|
| 4,714,260 | 12/1987 | Udagawa . |
| 4,834,399 | 5/1989 | Udagawa et al. . |
| 4,938,488 | 7/1990 | Udagawa et al. . |
| 4,995,624 | 2/1991 | Udagawa et al. . |
| 5,054,795 | 10/1991 | Udagawa et al. . |
| 5,209,504 | 5/1993 | Udagawa et al. . |
| 5,215,316 | 6/1993 | Udagawa . |
| 5,240,261 | 8/1993 | Udagawa et al. . |
| 5,842,702 | 12/1998 | Udagawa . |

FOREIGN PATENT DOCUMENTS 0 512 178  11/1992  European Pat. Off. .

*Primary Examiner*—Anthony Knight
*Assistant Examiner*—John L. Beres
*Attorney, Agent, or Firm*—Kanesaka & Takeuchi

[57] ABSTRACT

A metal laminate gasket of the invention is installed in an internal combustion engine having at least one hole therein. The gasket includes a first metal plate with a base section, and a second metal plate situated above the base section of the first metal plate. The first plate includes a first hole to be sealed, and a flange situated above the base portion around the first hole to form a solid portion. The second plate has a second hole, and an inclined portion around the second hole. The diameter of the second hole is substantially the same as the diameter of the outer edge of the flange. When the first and second plates are assembled, the flange is located inside the second hole. When the gasket is tightened, the flange non-resiliently seals around the hole, and the inclined portion resiliently seals outside the flange.

5 Claims, 1 Drawing Sheet

ND GASKET

BACKGROUND OF THE INVENTION AND RELATED ART STATEMENT

The present invention relates to a thin metal laminate gasket with a narrow sealing area.

A conventional metal laminate gasket is constructed by laminating several plates, and is provided with a complicated sealing portion around a hole to be sealed. Consequently, productivity of a metal laminate gasket is poor. As a result, a metal laminate gasket is higher in cost than other gaskets.

In a small and efficient engine, a gasket must have light weight with good sealing ability and be manufactured at a low cost.

In U.S. Pat. Nos. 4,834,399 and No. 5,054,795, the gaskets are formed of two plates, respectively. The sealing means is formed relatively simple, so that the sealing means is not suitable for a diesel engine where high pressures are formed in the cylinder bores.

Accordingly, one object of the present invention is to provide a metal laminate gasket for securely sealing around a hole, which has light weight and is simple in structure.

Another object of the invention is to provide a metal laminate gasket as stated above, which requires relatively narrow area for sealing.

A further object of the invention is to provide a metal laminate gasket as stated above, which can securely seal around a hole without concentrating sealing pressure at one portion.

A still further object of the invention is to provide a metal laminate gasket as stated above, which can be easily and economically manufactured.

Further objects and advantages of the invention will be apparent from the following description of the invention.

SUMMARY OF THE INVENTION

In accordance with the present invention, a metal laminate gasket is used for an internal combustion engine having at least one hole to be sealed.

The gasket comprises a first metal plate having a base section extending substantially throughout an entire area of the engine, and a second metal plate situated above the base section of the first plate. The first plate includes at least one first hole corresponding to the hole of the engine, at least one curved portion around the first hole to define the same, and a flange extending from the curved portion to be situated above the base section. The flange and a part of the base section together with the curved portion seal around the first hole when the gasket is tightened.

The second plate includes at least one second hole with an inner edge, and an inclined portion around the second hole. The diameter of the second hole is substantially the same as or slightly larger than an outer diameter of an outer edge of the flange. The second plate is located above the base section and the flange is located inside the second hole when the gasket is assembled.

Also, when the first and second plates are assembled, the inclined portion extends outwardly away from the base section of the first plate. A base section of the second plate may be located directly on or at a distance away from the base section of the first plate. The base section of the second plate is horizontally located above the flange.

When the gasket is tightened, even if the inner edge of the second plate is located slightly away from the outer edge of the flange, the inclined portion is compressed so that the inner edge abuts against the outer edge of the flange. As a result, the inward movement of the inner edge is prevented to thereby provide strong resilient surface pressure on the inclined portion to securely seal around the hole of the engine.

Preferably, the inner edge of the second plate is formed in the inclined portion as a part thereof. Namely, there is no portion extending parallel to the flange. Therefore, the inclined portion with the inner edge directly abuts against the outer edge of the flange of the first plate.

Since the second plate does not have a portion located parallel to the flange, the size of the inclined portion, or the portion to provide resilient sealing, can be made compact. In this respect, since the inner edge of the second plate abuts against the outer edge of the flange when the gasket is tightened, the inclined portion can provide resilient surface pressure for sealing around the hole.

The inclined portion may be a straight wall inclined relative to the base section of the second plate. Also, the inclined portion may be a curved bead formed around the second hole. Further, the first plate may have a bead under the inclined portion to surround the first hole, so that the inclined portion and the bead resiliently seal around the hole of the engine.

DETAILED DESCRIPTION OF THE PREFERRED EMBODIMENTS

Figure 1:
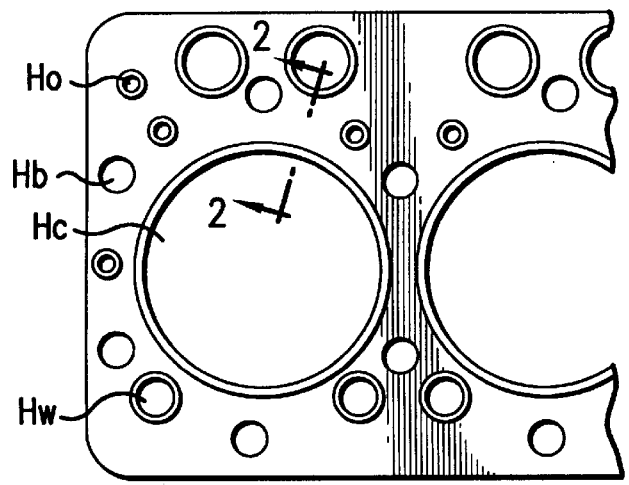
FIG. 1 is a plan view of a part of a first embodiment of a metal laminate gasket of the invention.
Figure 2:
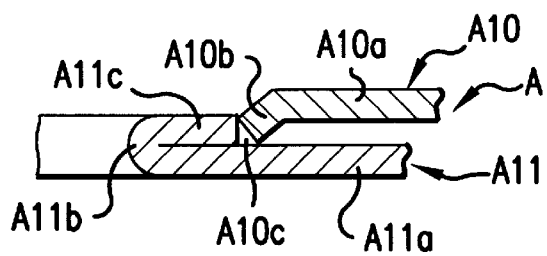
FIG. 2 is an enlarged sectional view taken along line 2—2 in FIG. 1.

Referring to FIGS. 1 and 2, a first embodiment A of a metal laminate gasket of the invention is shown. The gasket A is a cylinder head gasket, and includes cylinder bores Hc, water holes Hw, oil holes Ho and bolt holes Hb, as in the conventional gasket.

The sealing mechanism of the invention is applied around the cylinder bore Hc, but the same sealing mechanism may be formed around other holes, or for other gaskets, such as a manifold gasket.

As shown in FIG. 2, the gasket A comprises an upper plate A10, and a lower plate A11 situated under the upper plate A10. The upper plate A10 includes a base section A10a extending substantially throughout the entire area of the gasket A, and an inclined wall A10b extending inwardly and downwardly from the base section A10a to form a hole A10c inside the inclined wall A10b, which is larger than the cylinder bore Hc.

The lower plate A11 is situated under the upper plate A10 and extends substantially throughout the entire area of the gasket A. The lower plate A11 includes a base section A11a, a curved portion A11b to define the cylinder bore Hc, and a flange A11c situated above the base section A11a around the cylinder bore Hc. The flange A11c and a part of the base section A11a form a solid portion of the gasket A to seal around the cylinder bore Hc.

In the gasket A, the size of the hole A10c is slightly larger than the outer diameter of the flange A11c so that an inner edge of the inclined wall A10b is located immediately outside an outer edge of the flange A11c. The inner edge of the inclined wall A10b is located on the base section A11a of the lower plate A11, but the base section A10a of the upper plate A10 is situated away from the base section A11a of the lower plate A11.

In the present invention, when the gasket A is tightened between a cylinder head and a cylinder block (both not shown), the inclined wall A10b is compressed so that the base section A10a substantially abuts against the base section A11a. At this time, the inner edge of the inclined wall A10b, at first, tries to move toward the outer edge of the flange A11c, but the movement of the inclined wall A10b is stopped by the flange A11c. Therefore, the inclined wall A10b is compressed with strong pressure.

Therefore, when the gasket A is tightened, the inclined wall A10b provides resilient sealing pressure thereat, but the flange A11c is simply compressed without resiliency. The flange A11c forms the solid portion to non-resiliently seal around the cylinder bore, while the inclined wall A10b resiliently seals around the cylinder bore.

Since the solid portion is formed around the cylinder bore Hc, when the gasket A is tightened, a tightening pressure is not concentrated at one portion and is equally spread on the solid portion. Therefore, the gasket can be tightened at high tightening pressure without deformation of the cylinder head or cylinder block.

In the gasket A, the inclined wall A10b does not have a portion extending parallel to the flange A11c at the inner edge thereof. However, since the inner edge of the inclined wall A10b abuts against the outer edge of the flange A11c, the inclined wall A10b can provide a strong resilient sealing pressure thereat. Also, since the inner edge of the inclined wall A10b directly contacts the outer edge of the flange A11c, the size of the resilient sealing portion can be made small. Namely, the sealing area of the gasket is made small.

The gasket A is sealed non-resiliently by the solid portion and resiliently by the inclined wall. Also, the size of the sealing area is made compact.

Figure 3:
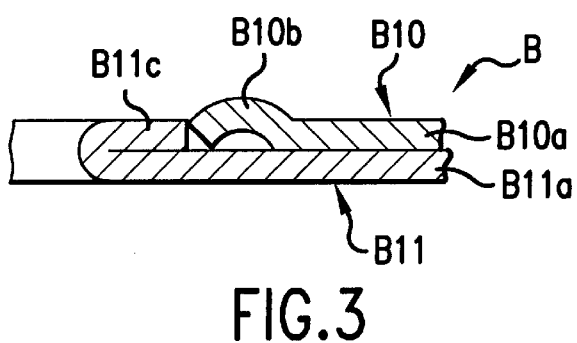
FIGS. 3, and 4 are section views, similar to FIG. 2, of second and third embodiments of the invention.

FIG. 3 shows a second embodiment B of the metal laminate gasket of the invention. The gasket B comprises an upper plate B10 with a base section B10a, and a lower plate B11 with a base section B11a and a flange B11c, similar to the gasket A.

In the gasket B, however, the upper plate B10 is provided with a bead B10b. The inner edge of the bead B10b does not have a portion parallel to the base section B10a, and is located close to the outer edge of the flange B11c.

When the gasket B is assembled, the base section B10a is located on the base section B11a, and the bead B10b projects vertically outwardly beyond the flange B11c. When the gasket B is tightened, the bead B10b is compressed, so that the inner edge of the bead B10b is moved toward the flange B11c. However, since the movement of the inner edge is restricted by the flange B11c, the bead B10b is strongly compressed.

The gasket B operates as in the gasket A.

Figure 4:
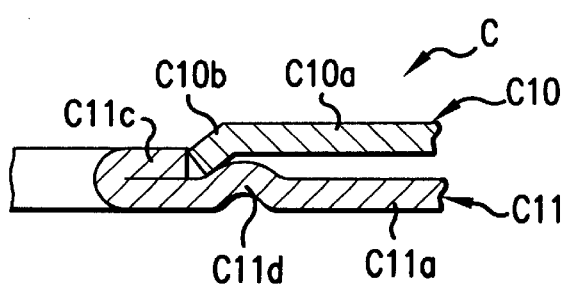

FIG. 4 shows a third embodiment C of the metal laminate gasket of the invention. The gasket C includes an upper plate C10 with a base section C10a and an inclined wall C10b, and a lower plate C11 with a base section C11a and a flange C11c, similar to the gasket A. In the gasket C, however, the lower plate C11 is further provided with a bead C11d under the inclined wall c10b.

When the gasket C is tightened, the inclined wall C10b and the bead C11d are compressed to seal around the cylinder bore Hc. In the gasket C, the area around the cylinder bore Hc is resiliently sealed by the inclined wall C10b and the bead C11d, so that the gasket is resiliently strongly sealed. The gasket C operates as in the gasket A.

In the gasket of the invention, the gasket includes a flat solid portion around a hole to be sealed, and an inclined portion outside the solid portion. Therefore, the gasket can be tightened strongly without deformation of the hole to be sealed by the flat solid portion. The gasket can be sealed resiliently outside the solid portion by the inclined wall. In the invention, the inclined wall is made compact, but it can provide sufficient resiliency outside the solid portion. The area around the hole can be sealed non-resiliently and resiliently.

While the invention has been explained with reference to the specific embodiments of the invention, the explanation is illustrative and the present invention is limited only by the appended claims.

What is claimed is:

1. A metal laminate gasket for an internal combustion engine having at least one hole therein comprising:

a first metal plate including a base section extending substantially throughout an entire area of the gasket, at least one first hole corresponding to the hole of the engine, at least one curved portion extending from the base section and situated around the first hole to define the first hole, and a flange extending from the curved portion to be situated above the base portion around the first hole and having an outer edge, said flange being located above the base portion without having a space therebetween to thereby form a solid portion by the flange and the base portion around the first hole so that said flange and a part of the base section together with the curved portion seal around the first hole when the gasket is tightened, and a second metal plate situated above the base section of the first plate, said second plate having at least one second hole with an inner edge, the diameter of the second hole being greater than an outer diameter of the outer edge of the flange so that the second plate is located above the base section and the flange is located inside the second hole when the gasket is assembled, and an inclined portion formed around the second hole, said inclined portion, when the first and second plates are assembled, extending vertically outwardly from the inner edge beyond the flange while said inner edge is formed in the inclined portion as a part thereof, said inclined portion, when the gasket is tightened, being compressed so that the inner edge of the second plate directly abuts against the outer edge of the flange without having a portion parallel to the flange and an inward movement of the inner edge is prevented by the outer edge of the flange to thereby provide a strong resilient surface pressure on the inclined portion to securely seal around the hole of the engine.

2. A metal laminate gasket according to claim 1, wherein said inner edge of the second plate contacts the outer edge of the flange when the first and second plates are assembled.

3. A steel laminate gasket according to claim 1, wherein said inclined portion is a straight wall inclined relative to a portion of the second plate outside the inclined portion.

4. A metal laminate gasket according to claim 3, wherein said first plate further includes a bead situated at the base portion to surround the first hole, said bead being located under the inclined portion so that the inclined portion and the bead resiliently seal around the hole of the engine.

5. A metal laminate gasket according to claim 1, wherein said inclined portion is a curved bead formed around the second hole.

\* \* \* \* \*